United States Patent [19]
Marlow

[11] 3,842,694
[45] Oct. 22, 1974

[54] HYDROMECHANICAL TRANSMISSION AND CONTROL

[75] Inventor: Jerry R. Marlow, Greenwood, Ind.

[73] Assignee: General Motors Corporation, Detroit, Mich.

[22] Filed: May 14, 1973

[21] Appl. No.: 359,764

[52] U.S. Cl............ 74/867, 74/687, 74/865, 74/869
[51] Int. Cl............... B60k, F16h 47/04
[58] Field of Search..... 74/687, 865, 867, 868, 869

[56] References Cited
UNITED STATES PATENTS

| | | | |
|---|---|---|---|
| 3,006,206 | 10/1961 | Kelley et al. | 74/861 X |
| 3,455,184 | 7/1969 | Frandsen et al. | 74/867 X |
| 3,611,838 | 10/1971 | Utter | 74/868 |
| 3,643,527 | 2/1972 | Ohnuma | 74/868 |
| 3,705,642 | 12/1972 | Thompson | 74/869 X |
| 3,733,931 | 5/1973 | Nyman et al. | 74/868 |
| 3,738,198 | 6/1973 | Kell | 74/868 |
| 3,748,930 | 7/1973 | Lepelletier | 74/867 X |
| 3,754,483 | 8/1973 | Edmunds | 74/868 X |

*Primary Examiner*—Benjamin W. Wyche
*Assistant Examiner*—Lance W. Chandler
*Attorney, Agent, or Firm*—Donald F. Scherer

[57] ABSTRACT

An engine driven hydromechanical transmission and control having a hydrostatic portion and a step ratio gearing portion wherein the hydrostatic ratio and the gearing ratio are changed substantially simultaneously. The control for the hydrostatic portion produces a variable pressure signal for varying the hydrostatic ratio while the gear ratio is maintained. The gear ratio change portion of the control directs a fixed bias pressure to the hydrostatic ratio portion when an upshift occurs thereby permitting the variable pressure signal to repeat through a portion of the variable control pressure range during the succeeding gear ratio.

6 Claims, 6 Drawing Figures

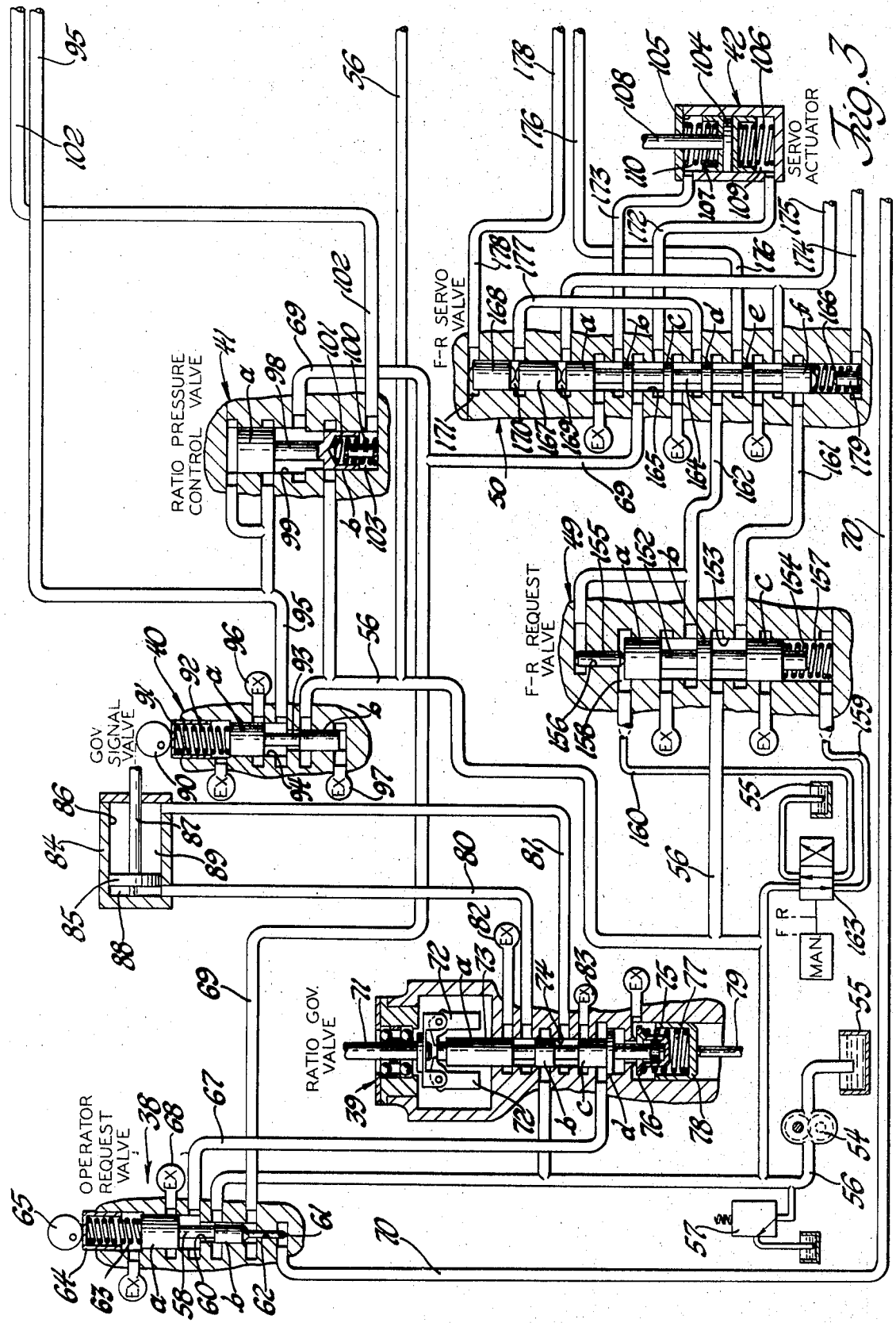

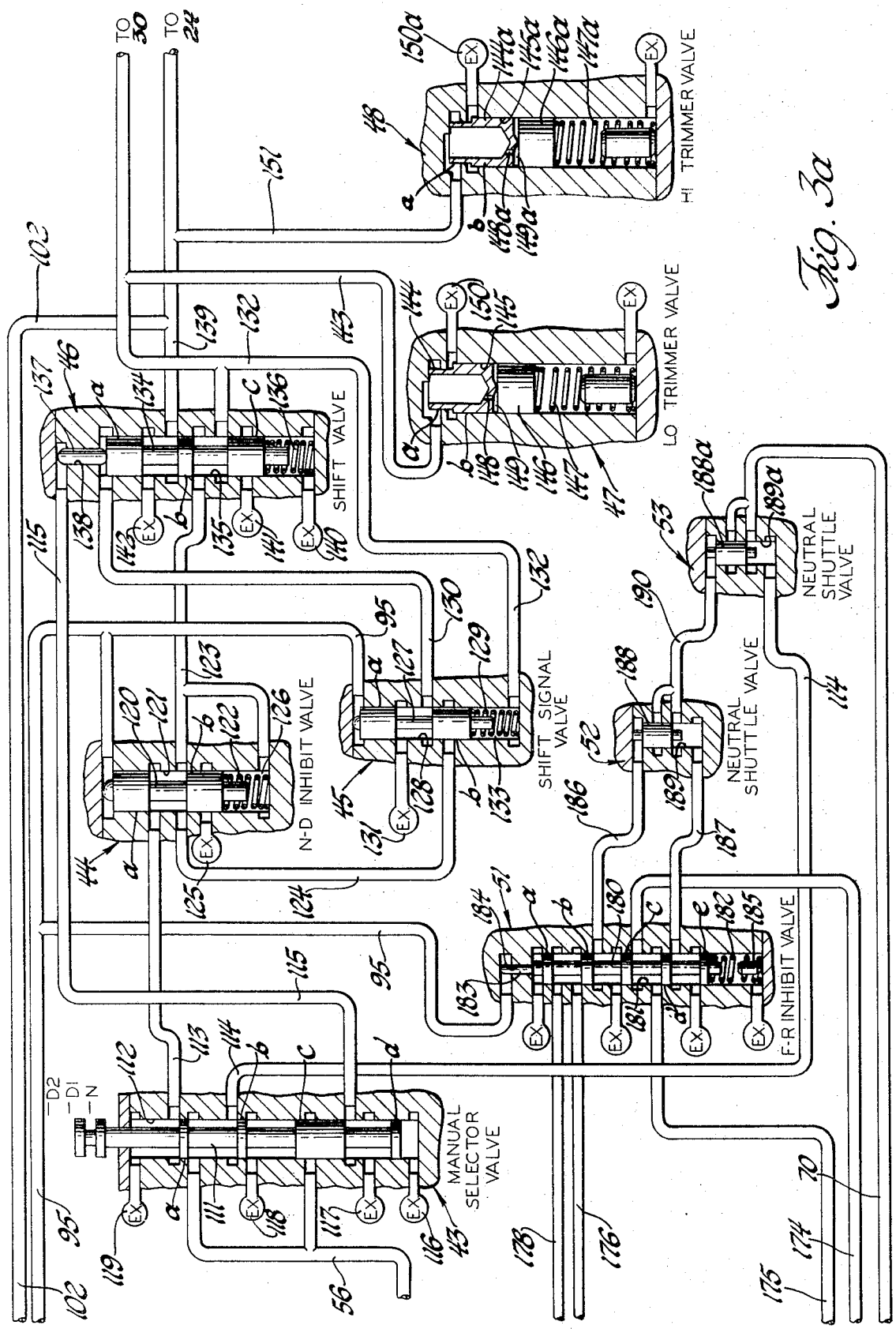

HYDROMECHANICAL TRANSMISSION AND CONTROL

This invention relates to hydromechanical transmissions and controls and more particularly to hydromechanical transmissions and controls having a non-synchronous range shift.

The present invention is incorporated in a hydromechanical transmission having a hydrostatic drive portion drivingly connected between an engine and a multi-speed step ratio gearing arrangement such that the hydrostatic portion provides an infinitely variable drive ratio between the engine and the gearing and the gearing provides a plurality of step ratio drives between the hydrostatic transmission output and the vehicle output drive. Since the hydrostatic transmission is essentially a solid drive connection, which will not accommodate slip between the input and output thereof, the ratio of the hydrodstatic transmission must be changed simultaneously with a change in the step ratio gearing. Thus, it is necessary to provide a control for the transmission in which the hydrostatic ratio control and the control for the interchange of friction devices in the gearing arrangement must be interconnected. The present invention provides a hydraulic interrelationship between the hydrostatic control and the step gearing control such that during a range shift in the gearing the control pressure which determines the hydrostatic ratio is modified, resulting in a change in the hydrostatic ratio.

It is an object of this invention to provide an improved hydromechanical transmission and control and which hydraulic ratio and gear ratio changes are accommodated substantially simultaneously.

It is another object of this invention to provide an improved hydromechanical transmission and control in which a modification of the hydraulic ratio control pressure occurs substantially simultaneously with a gear ratio change.

A further object of this invention is to provide in an improved hydromechanical transmission and control a reduction in the hydraulic ratio control pressure simultaneous with the upshift in the mechanical gear ratio and vice versa.

It is another object of this invention to provide in an improved hydromechanical transmission and control a fixed bias pressure on the hydraulic ratio control pressure valve simultaneous with an upshift in the mechanical gear ratio thereby permitting the hydraulic ratio control pressure to repeat during the higher gear ratio.

These and other objects and advantages of the present invention will be more apparent from the following description and drawing in which:

FIGS. 3 and 3a are a diagrammatic representation of the control used with the transmission in FIG. 1;

FIG. 4 is a diagrammatic representation of a modification of a portion of the control shown in FIG. 3a;

Figure 1:
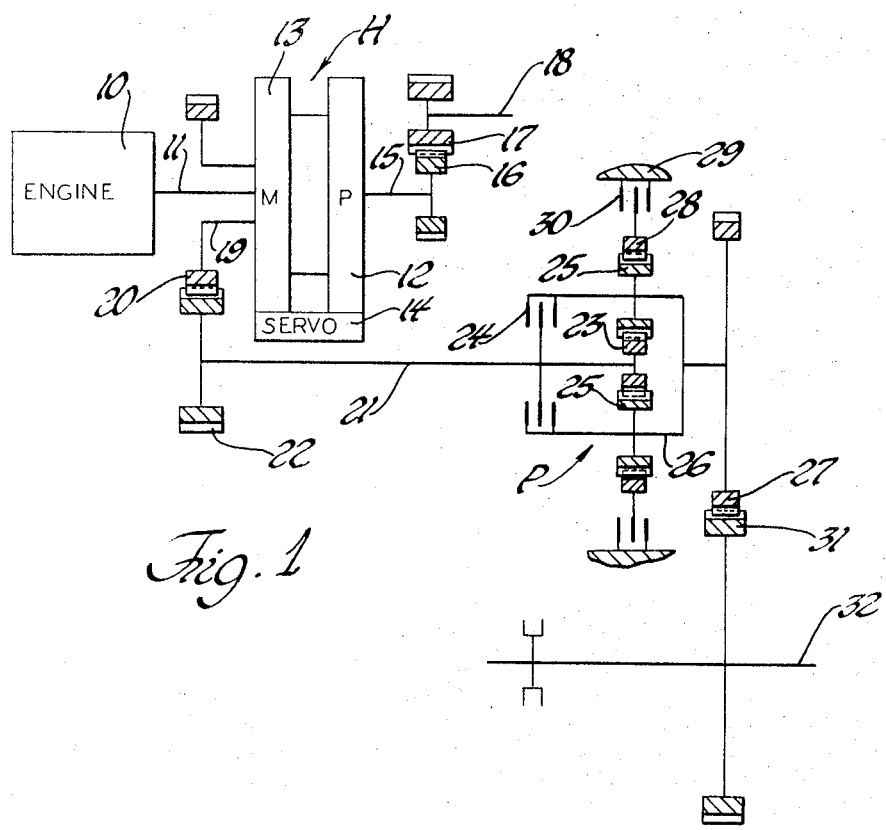
FIG. 1 is a schematic representation of a hydromechanical transmission.

Referring to the drawings particularly FIG. 1 there is shown a conventional engine 10 having an output shaft 11 drivingly connected to a conventional variable displacement hydraulic pump 12 which is in fluid communication with a conventional variable displacement hydraulic motor 13. The displacements of the pump 12 and motor 13 are controlled by conventional servo system 14. The pump 12, motor 13 and servo control 14 may be of any conventional design for example the pump and motor may be constructed similar to that shown in U.S. Pat. No. 3,274,946 issued to Simmons and the servo 14 may be any of the well known rotary or linear servo valves.

The input shaft 11 is drivingly connected to the drive shaft of the pump 12 to a shaft 15 which is drivingly connected to a gear 16. The gear 16 meshes with a gear 17 which is drivingly connected to a power take off shaft 18. The power take off shaft 18 provides a shaft driven proportional to engine speed, which can be adapted to drive vehicle accessories.

The motor 13 is drivingly connected to a hydrostatic transmission output shaft 19 on which is drivingly connected a gear 20 which drives planetary transmission input shaft 21 through a gear 22. The shaft 21 is drivingly connected to a sun gear 23 and a conventional fluid operated clutch 24. The sun gear 23 meshes with a plurality of pinion gears 25, rotatably mounted on a planetary carrier 26 which carrier is drivingly connected with the clutch 24 and an output gear 27. The pinions 25 also mesh with a ring gear 28 which is selectively connectable to a stationary member 29 through a selectively engageable fluid operated brake 30. The output gear 27 meshes with another output gear 31 which is drivingly connected to a transmission output shaft 32. The transmission output shaft 32 is drivingly connected to the vehicle drive wheels, not shown.

A planetary gearing arrangement, generally designated P, comprised of sun gear 23, planetary pinions 25, ring gear 28, clutch 24 and brake 30 is a two-speed planetary gear system. A speed reduction between shaft 21 and drive gear 27 is provided when the brake 30 is engaged thus establishing ring gear 28 as a reaction member in the planetary gear set P. A one to one drive ratio is provided between the shaft 21 and the gear 27 when the clutch 24 is engaged and the brake 30 is disengaged.

The pump 12 and motor 13 provide an infinite variable hydrostatic transmission, generally designated H, between the engine shaft 11 and the gearing input shaft 21. The infinitely variable ratio is provided by varying the displacements of the pump 12 and motor 13 such that, as the displacement of pump 12 is increased the motor 13 will be driven more rapidly, and when the displacement of the motor 13 is decreased, the output speed of motor 13 will also increase. Thus at a fixed engine output speed the transmission output speed can be infinitely varied within a range by engaging brake 30 and varying the displacements of the pump 12 and motor 13. The output speed can also be varied in this range by varying the engine speed. To extend the speed range of the vehicle the brake 30 is disengaged while the clutch 24 is engaged thus providing a step ratio change in the gearing portion of the transmission. When this step ratio change is made, the ratio in the hydrostatic portion of the transmission must be changed accordingly, so that the output shaft 32 of the transmission is not required to undergo rapid accelerations or decelerations which would result in shift shocks being transmitted through the drive train, while the engine is maintained at a constant speed.

Figure 2:
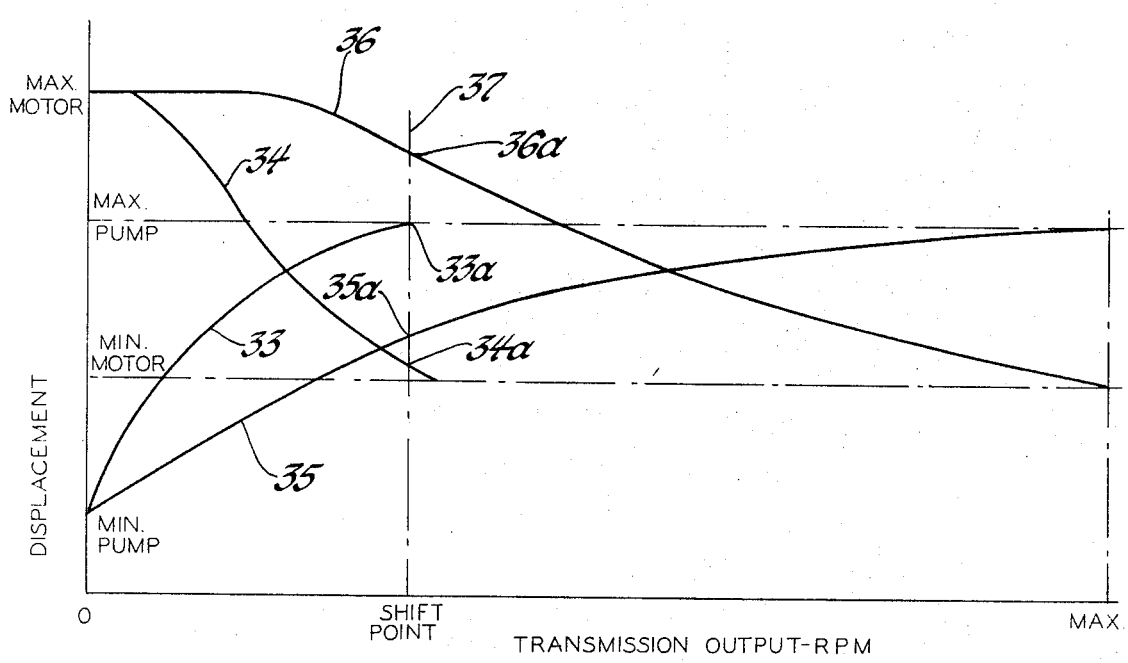
FIG. 2 is a curve depicting the hydraulic displacement changes relative to transmission output speed while transmission input speed remains constant.

The curve shown in FIG. 2 provides a pictorial representation of the changes in effective displacement of the pump 12 and motor 13 to provide the variable hydrostatic drive ratio. When the brake 30 is engaged the effective pump displacement is controlled to correspond to curve 33 and the effective motor displacement is controlled to correspond to a curve 34. When the pump 12 is at its maximum effective displacement along curve 33 and the motor 13 is at its minimum effective displacement along curve 34, a further increase in vehicle speed is accomplished by interchanging the brake 30 and clutch 24. While this interchange is being made, the effective pump displacement must be changed to correspond to curve 35 while the effective motor displacement is changed to correspond to curve 36. This shift change, for maximum vehicle performance and full utilization of the transmission drive range, would occur where curves 33, 34, 35, and 36 intersect the vertical line 37.

The transmission will provide both forward and reverse drives by varying the displacement of the pump 12 in opposite directions depending on whether forward or reverse driving is desired. This type of overcenter pump is well known in the art and many such pumps are available for use.

The valving arrangement shown in FIGS. 3 and 3a provide the necessary controls for the servo 14 which controls the displacement of pump 12 and motor 13 and for the fluid operated brake 30 and clutch 24. The valving provides three control functions which are integrated into a single unit. The valving provides a hydraulic ratio control, a shift control, and a directional control. The hydraulic ratio control is provided by an operator request valve 38, a ratio governor valve 39, a governor signal valve 40, a ratio pressure control valve 41 and a servo actuator 42. The shift control function is provided by a manual selector valve 43 and a neutral-drive inhibit valve 44, a shift signal valve 45, a shift valve 46, and trimmer valves 47 and 48. The direction control function is provided by a forward-reverse request valve 49, a forward-reverse servo control 50, a forward reverse inhibit valve 51 and two neutral shuttle valves 52 and 53.

Fluid pressure for the control system is provided by a conventional fluid pump 54 which draws fluid from a reservoir 55 and delivers the fluid under pressure to a main passage 56. Fluid pressure in the main passage 56 is controlled by a conventional pressure regulator valve 57. Preferably, the fluid from pump 54 is delivered proportionally to the speed of the engine shaft 11 such that fluid pressure is provided for the control system whenever the engine 10 is operating.

The operator request valve 38 includes a valve spool 58 having a large diameter land a and a small land diameter b which will slidably dispose in a step bore 60. A pin 61 is slidably disposed in a bore 62 in abutting relationship with land b of valve spool 58. A compression spring 63 is disposed between land a of valve spool 58 and a spring seat 64 which abuts an operator controlled cam surface 65. The cam 65 is controlled by the operator through a conventional linkage, not shown, such that the compression force in spring 63 and, therefore, the bias force on valve spool 58 may be varied by the operator. The step bore 60 is in fluid communication with the main passage 56, an operator request pressure passage 67, an exhaust passage 68 and a ratio feedback passage 69. The pin 61 is in fluid communication with a neutral return passage 70. The operator request valve 38 is a pressure reducing valve which provides a reduction in main pressure between passage 56 and passage 67. Fluid pressure in passage 67 is determined by the force in spring 63 such that when the force in spring 63 is greater than the pressure in passage 67 acting on the differential area between lands a and b, the valve spool 58 will move downward in bore 60 thereby permitting fluid communication from main passage 56 to passage 67 between lands a and b. Thus the pressure in passage 67 will increase until the spring force is balanced by pressure in the differential area. If the force in spring 63 is decreased, the pressure acting on the differential area between lands a and b will move the valve spool 58 upward such that excess pressure may be exhausted through passage 68 until the spring force is again balanced. The spring force is also balanced by pressure in passages 69 and 70 which will be explained later.

The ratio governor valve 39 includes a shaft 71 which is driven by the engine shaft 11, fly weights 72, and valve spool 73 having spaced equal diameter lands a, b, and c and a larger diameter land d, slidably disposed in a step bore 74. The valve spool 73 is rotatably mounted by a bearing 75 in a spring seat 76. A compression spring 77 is disposed between the spring seat 76 and another spring seat 78 which abuts a pin 79. The pin 79 is connected through a linkage, not shown, to the engine throttle system so that a position proportional to engine throttle position is imposed on the spring seat 78. Thus the valve spool 74 is responsive to two vehicle performance parameters, namely engine speed acting on one end of spool 73, through the fly weights 72, and engine throttle setting acting on the other end of spool 73 through the spring 77. The valve spool 73 is slidable in valve bore 74 in response to these vehicle parameters and also in response to fluid pressure in the request pressure passage 67 which is in fluid communication with the differential area between lands c and d of valve spool 73. The bore 74 is also in fluid communication with main passage 56 adjacent land b, an advance passage 80 between lands a and b, a return passage 81 between lands b and c and exhaust passages 82 and 83 adjacent lands a and c respectively. If the force imposed on valve spool 73 by the throttle position thrust, through spring 77, is greater than the force imposed on valve spool 73 by the fly weights 72 and pressure in passage 67, the valve spool 73 will be moved upward in bore 74 providing fluid communication between passage 56 and return passage 81 valve. Upward movement of spool 73 will also connect advance passage 80 to exhaust passage 82 between lands a and b. When the force imposed by fly weights 72 and fluid pressure in passage 67 is greater than the throttle referenced force, the valve spool 73 will move downward in bore 74 thereby providing fluid communication between main passage 56 and advance passage 80 while also providing fluid communication between return passage 81 and exhaust passage 83.

The advance passage 80 and return passage 81 are in fluid communication with an actuator 84 which is a portion of the governor signal valve 40. The actuator 84 has a piston 85 slidably disposed in a cylinder 86 to form an advance chamber 88 and a return chamber 89. The piston 85 is secured to a piston rod 87. The advance passage 80 is in fluid communication with advance chamber 88 and the return passage 81 is in fluid communication with the return chamber 89. The piston rod 87 is drivingly connected to a cam 90 which abuts a spring seat 91. The spring seat 91 is held in abutting with the cam 90 by a compression spring 92 positioned between a valve spool 93 and the spring seat 91. The valve spool 93 has a large diameter land a and a small diameter land b which are slidably disposed in a step bore 94. The step bore 94 is in fluid communication with main passage 56 adjacent land b, a governor passage 95 between lands a and b and a pair of exhaust passages 96 and 97. The governor signal valve 40 is a pressure reducing valve which admits fluid from main passage 56 between lands a and b until the fluid pressure acting on the differential area between lands a and b is equal to the force imposed on the valve spool 93 by the spring 92. The pressure imposed on the differential area between lands a and b is also in fluid communication with governor passage 95 and this pressure is the ratio governor output pressure. Thus the ratio governor output pressure in passage 95 is variable, since the force in spring 92 is varied by the cam 90 when the cam 90 is rotated by the actuator 84 in response to fluid pressure delivered to either advance chamber 88 or return chamber 89. The pressurization of chambers 88 and 89 is, of course, determined by the ratio governor valve 39 as explained previously. When fluid pressure is admitted to chamber 88, the piston 85 will move to the right thereby rotating the cam 90 to increase the spring force which will result in an increase in ratio governor output pressure in passage 95. When fluid pressure is admitted to chamber 89, the piston 85 will move to the left with a corresponding decrease in ratio governor output pressure. The governor passage 95 is in fluid communication with the ratio pressure control valve 41, the neutral drive inhibit valve 44, the shift signal valve 45, and the forward-reverse inhibit valve 51.

The ratio pressure control valve 41 includes a valve spool 98 having a large diameter land a and a spaced lower diameter land b slidably disposed in a step bore 99. A compression spring 100 is compressed between one end of bore 99 and a spring seat 101 formed within valve land b. The step bore 99 is in fluid communication with the main passage 56 adjacent the periphery of land b, the ratio feedback passage 69 intermediate lands a and b and the governor passage 95 adjacent the periphery of land a and adjacent the end of valve land a. The step bore 99 is also in fluid communication with a high ratio signal passage 102 adjacent one end of valve land b. The valve land b and the step bore 99 cooperate to provide a bias chamber 103 which is pressurized during the high gear ratio which will be explained later. Governor pressure in passage 95 operates on the end of valve land a to force the spool 98 downward into bore 99 against the force of spring 100 until valve land b opens the main passage 56 between lands a and b. Fluid pressure from main passage 56 then actuates on the differential area between lands a and b to move the valve spool 98 upward thereby closing main passage 56, when the pressure intermediate valve lands a and b plus the force in spring 100 is equal to the governor pressure acting on the end of valve land a. This pressure is open to the ratio feedback passage 69 which is communicated to the operator request valve 38 where it cooperates with fluid pressure in the request pressure passage 67 to urge the valve spool 58 against the spring 63 to limit the fluid pressure in the request pressure passage 67. If the governor pressure in governor passage 95 should decrease, indicating a return signal in passage 81 from the ratio governor valve 39, the fluid pressure in the ratio feedback passage 69 will be communicated to the governor passage 95, thereby reducing the pressure in passage 69 until the valve spool 98 is again balanced. The pressure in the ratio feedback pressure 69 is also connected to the forward-reverse servo control valve 50, which functions to direct the pressure therein to the servo actuator 42.

The servo actuator 42 is a spring centered piston which converts fluid pressure to mechanical movement for actuation of a servo 14. The servo actuator 42 has a piston 104 slidably disposed in a valve bore 105 and centered therein by a pair of compression springs 106 and 107. A piston rod 108 is secured to the piston 104 to provide a mechanical input to the servo 14. Piston 104 cooperates with the cylinder 105 to form a forward ratio control chamber 109 and a reverse ratio control chamber 110. When fluid pressure is admitted to the forward control chamber 109 the piston 104 will be moved against the force in spring 107, an amount determined by the value of the fluid pressure in chamber 109, to operate on the servo 14 to cause a change in the displacement of the hydrostatic transmission H. Admission of fluid pressure to the reverse ratio chamber 110 will result in movement of the piston 104 against the force of spring 106 to effect a reverse ratio change in the hydrostatic transmission H. The pressure available to move the piston 104 is generated by the ratio pressure control valve 41. As explained above, this is a variable pressure which is determined by the fluid pressure in the governor passage 95. Since the fluid pressure in governor passage 95 is determined by the vehicle parameters operating on the ratio governor valve 39, the servo actuator 42 generates a mechanical signal corresponding to the vehicle parameters. Therefore, the ratio of the hydrostatic transmission, which is controlled by the servo actuator 42 and the servo 14, corresponds to these vehicle performance parameters.

The manual selector valve 43 includes the spool valve 111 having spaced equal diameter lands a, b, c, and d slidably disposed in a valve bore 112. The valve spool 111 is movable to three positions, neutral N, low range D1 and high range D2, by a conventional linkage not shown. The valve bore 112 is in fluid communication with the main passage 56 adjacent the periphery of land c and intermediate lands a, and b when the valve spool is in the N position. Also in the N position the valve bore 112 is in fluid communication with a low ratio passage 113 intermediate land a and one end of valve bore 112, a neutral passage 114 intermediate lands a and b, a high ratio passage 115 intermediate lands c and d and a plurality of exhaust passages 116, 117, 118, and 119. In the neutral position the low ratio passage 113 is exhausted through passage 119, the high ratio passage 115 is exhausted through passage 117 and the neutral passage 114 is pressurized from main passage 56. When the valve spool 111 is moved to the D1 position, the low ratio passage 113 is pressurized from main passage 56, between lands a and b, neutral passage 114 is exhausted through passage 118 and the high ratio passage 115 remains exhausted through passage 117. When the valve spool 111 is moved to the D2 position, the low ratio passage 113 remains pressurized, neutral passage 114 remains exhausted and high ratio passage 115 is pressurized from main passage 56 between lands c and d. The low ratio passage 113 is connected with the neutral-drive inhibit valve 44. The neutral passage 114 is connected to the neutral shuttle valve 53. The high ratio passage 115 is connected to the shift valve 46. Thus, when the selector valve 43 is in the D1, or D2 position, the neutral-drive inhibit valve 44 receives fluid pressure from main passage 56. In the N position, the neutral shuttle valve 53 is pressurized by fluid pressure from main passage 56, and in the D2, the shift valve 46 receives fluid pressure from main passage 56.

The neutral-drive inhibit valve 44 includes valve spool 120 having a spaced equal diameter lands $a$ and $b$ slidably disposed in a valve bore 121 and a compression spring 122 compressed between valve land b and one end of valve bore 121 to urge valve spool 120 to the position shown. The valve bore 121 is in fluid communication with the governor passage 95 adjacent the end of valve land $a$, the low ratio passage 113, intermediate lands $a$ and $b$, a drive passage 123 intermediate lands $a$ and $b$, a high ratio hold supply passage 124, and an exhaust passage 125 adjacent the periphery of valve land $b$. Drive passage 123 is also connected with a drive hold chamber 126 formed between the valve land b and the end of valve bore 121. The drive passage 123 is also connected with the shift valve 46, and the high ratio hold supply passage 124 is connected with the shift signal valve 45.

With the neutral-drive inhibit valve 44 in the position shown, fluid pressure from main passage 56 would be communicated to drive passage 123 between lands a and b of valve spool 120, when the manual selector valve 43 is moved from neutral to the D1 or D2 position. However, should the governor pressure in passage 95 be sufficiently high to overcome the force in spring 122, the valve spool 120 would be moved downward in the bore 121 such that passages 123 and 124 would be opened to exhaust 125 which passage 113 would be closed by valve land $a$. A governor signal in passage 95 sufficient to overcome the force in spring 122 would indicate that the ratio of the hydrostatic transmission H is sufficiently high so that a shift shock would occur should the manual selector valve 43 be moved from the N position to the D1 or D2 position. Thus, with a high governor signal in passage 95, a shift from N to D1 or D2 will not result in fluid pressure passing through the neutral-drive inhibit valve 44 until the governor pressure in passage 95 is reduced by reducing the ratio in the hydrostatic transmission H. However, once the drive passage 122 has been pressurized, fluid pressure acting in the drive hold chamber 126 will prevent governor pressure in passage 95 from shifting the valve spool 120.

The shift signal valve 45 includes a valve spool 127 having spaced equal diameter lands $a$ and $b$ slidably disposed in a valve bore 128 and a compression spring 129 compressed between one end of valve bore 128 and valve land $b$. The valve bore 128 is in fluid communication with a high ratio hold passage 130, an exhaust passage 131 and a low ratio engage passage 132. With the valve spool 127 in the position shown, the high ratio hold passage 130 is exhausted between lands $a$ and $b$ through passage 131 and the high ratio hold supply passage 124 is blocked by valve land $b$. The low ratio engage passage 132 is in fluid communication with a low ratio hold chamber 133 formed by valve land $b$ and valve bore 128. The shift signal valve 45 functions to assist the shift valve 46 as will be explained later.

The shift valve 46 includes a valve spool 134 having spaced equal diameter lands $a$, $b$, and $c$ slidably disposed in a valve bore 135, a compression spring 136 compressed between valve land $c$ and the end of bore 135, and a pin 137 slidably disposed in a bore 138 having one end thereof abutting land $a$. The other end of pin 137 is in fluid communication with the high ratio passage 115 such that, when high ratio passage 115 is pressurized, the valve spool 134 and pin 137 will be moved against the force in spring 136 to upshift valve 46. The valve bore 135 is in fluid communication with the drive passage 123, the low ratio engaged passage 132, a high ratio engaging passage 139, the high ratio hold passage 130 and three exhaust passages 140, 141, and 142. In the position shown, the drive passage 123 is in fluid communication between lands $b$, and $c$ with the low ratio engage passage 132 and the high ratio engage passage 139 is in fluid communication with exhaust passage 142. Therefore in the position shown, the low ratio brake 30 will be engaged if the manual selector valve 43 is moved to the D1 position, assuming thee neutral-drive inhibit valve 44 is in the position shown. If the manual selector valve 43 is moved to the D2 position, the passage 115 will be pressurized so that pressure acting on pin 137 will upshift valve spool 134 thereby providing fluid communicating between drive passage 123 and the high ratio engage passage 139 while exhausting the low brake 30 via the low ratio engage passage 132 and exhaust passage 141. When the low ratio engage passage 132 is exhausted the low ratio chamber 133 on shift signal valve 45 will be exhausted; such that governor pressure, in passage 95, acting on land a of valve spool 127 will cause the valve spool 127 to shift against the spring 129. When the shift signal valve 49 has shifted, the high ratio hold passage 139 will be pressurized thereby providing pressure bias on valve land $a$ of valve spool 134 to maintain the shift valve 46 the upshifted position. With the high ratio clutch 24 engaged, a manual downshift, or manual selector valve 43 will not result in a downshift in the gearing unless the governor pressure on passage 95 is sufficiently low to permit the spring 129 to move the valve spool 127, which movement would exhaust the high ratio hold passage 130. This will prevent forced downshifts at high vehicle speeds. When the governor pressure in passage 95 is reduced, a high to low gear ratio change will be effected.

The low ratio engage line 132 is connected to the low trimmer passage 143 which is connected to the low trimmer valve 47. The low trimmer valve 47 is a conventional trimmer valve including a trimmer regulator element 144 having a small diameter land a and a large diameter land b slidably disposed in bore 145, an actuator plug 146 slidably disposed in the valve bore 145 and a compression spring 147 disposed between one end of valve bore 145 and the actuator plug 146. A restrictive passage 148 permits restricted fluid communication between one end of the regulator element 144 and a chamber 149 formed between the regulator element 144 and the actuator plug 146. The bore 145 is in fluid communication with an exhaust passage 150. It is the function of a trimmer valve to regulate the pressure of an oncoming friction device. The operation of trimmer valves such as 47 and 48 are more fully discussed in U.S. Pat. Application Ser. No. 104,867, filed by J. O. Edmunds, Jan. 8, 1971, and assigned to the assignee of this application. The high trimmer valve 48 is in fluid communication with the high ratio engaged line 139 through a high trimmer passage 151. The high trimmer valve 48 is similar in construction and function to the trimmer valve 47, and the corresponding components thereof have been given the same numerical designation with an *a* suffix.

The high ratio engage line 139 is also connected to the high ratio signal line 102 which as previously described is in fluid communication with chamber 103 of the ratio pressure control valve 41. Therefore, when the high ratio clutch 24 is engaged, a pressure bias is communicated to chamber 103 adjacent the end of valve land *b* of the valve 41. The pressure bias acting on valve land *b* will hold the valve spool 98 upward against the governor bias pressure, since the pressure bias in chamber 103, and the force in spring 100 are greater than governor pressure in passage 95. The pressure in the ratio feedback passage 69, will, after an upshift, vary in pressure equal to the pressure in governor passage 95. The pressure in the ratio feedback passage 69 will have a lower value when the high ratio clutch is engaged than when the low ratio brake was engaged at the same pressure level in the governor pressure passage 95. Since the servo actuator 42 responds to the pressure in the ratio feedback passage 69, a change in the ratio of the hydraulic transmission H will occur simultaneously with the change in the planetary gearing P. Referring again to FIG. 2, the displacement curves shown are determined by the pressure in the ratio feedback passage 69 acting on the servo actuator 42. At the shift point 37, the fluid pressure in passage 69 is sufficient to maintain the effective pump displacement at point 33*a* and the motor displacement at point 34*a*. However, after the shift occurs, it is desirable to have the pump displacement at point 35*a* and the motor displacement at point 36*a* such that the hydrostatic ratio will correspond to the new gear ratio to provide an overall transmission ratio that is the same before and after the shift has occurred. To accomplish this, the fluid pressure acting on the servo actuator 42 must be adjusted to provide the new displacement ratio. The pressure bias in chamber 103 provides this adjustment.

The forward-reverse request valve 49, shown in FIG. 3, includes a valve spool 152 having spaced equal diameter lands *a*, *b*, and *c* slidably disposed in a valve bore 153, a compression spring 154 disposed between land *c* and one end of bore 153 and a pin 155 slidably disposed in a bore 156. The valve spool 152 cooperates with valve bore 153 to form a forward hold chamber 157 and a reverse hold chamber 158 at opposite ends thereof. The forward hold chamber 157 is in fluid communication with a forward hold passage 159 and the reverse hold chamber 158 is in fluid communication with a reverse hold passage 160. The bore 153 is in fluid communication with the main passage 56, a forward passage 161, and a reverse passage 162 which is also in fluid communication with one end of the pin 155. The forward hold passage 159 and the reverse hold passage 160 are pressurized from main passage 56 through a conventional four-way valve 163. The four-way valve 163 may be any of the conventional valves which provide selective fluid communication between the pressure inlet passage and the pressure outlet passages. The valve 163 is moveable to two positions such that passage 159 can be pressurized while passage 160 is exhausted, or passage 160 can be pressurized while the passage 159 is exhausted. These positions correspond to forward or reverse. When the valve 163 is in the forward position, the forward-request valve 49 will be in the position shown. When the valve 163 is moved to the reverse position the reverse hold chamber 158 will be pressurized thereby providing fluid communication between main passage 56 and the reverse passage 162 between lands a and b while the forward passage 161 is exhausted.

The forward-reverse servo control valve 50 includes a valve spool 164 having spaced equal diameter lands *a*, *b*, *c*, *d*, *e*, and *f* slidably disposed in a valve bore 165, a compression spring 166 disposed between land f and one end of valve bore 165 and a pair of plug members 167 and 168 slidably disposed in bore 165. The plug 167 cooperates with land *a*, plug 168 and bore 165 to form two chambers 169 and 170. The plug 168 cooperates with bore 165 to form a chamber 171. The valve bore 165 is in fluid communication with the forward passage 161, the reverse passage 162, the ratio feedback passage 69, a forward servo passage 172, a reverse servo passage 173, a forward signal passage 174, a forward inhibit passage 175, a reverse signal passage 176, a reverse hold passage 177, and a reverse inhibit passage 178. In the forward position of the valve spool 164, as shown, the forward passage 161 is blocked by land *f*. The forward inhibit passage 175 is exhausted between lands *e* and *f*, the reverse signal passage 176 is in fluid communication with reverse passage 162 between lands *d* and *e*, the reverse hold passage 177 is exhausted between lands *c* and *d*, the forward servo passage 172 is in fluid communication with the ratio feedback passage 69 between lands *b* and *c*, and the reverse servo passage 173 is exhausted between lands *a* and *b*. In the reverse position of valve 50, the valve spool 164 will be shifted against the spring 166 until it abuts a stop 179. The spool valve 164 will be shifted to the reverse position when there is fluid pressure communicated to any of the chambers 169, 170, or 171. In the reverse position forward passage 161 will be in fluid communication with a forward inhibit passage 175 between lands *e*, and *f*, a reverse signal passage 176 will be exhausted between lands *d*, and *e*, the reverse hold passage 177 will be in fluid communication with the reverse passage 162 between lands *c*, and *d*, the forward servo passage 172 will be exhausted between lands *b*, and *c*, and the reverse passage 173 will be in fluid communication with the ratio feedback passage 69 between lands *a*, and *b*. Thus, in the forward position, fluid pressure in the ratio feedback passage 69 is communicated to chamber 109 of the servo actuator 42; and in the reverse position, fluid pressure in the ratio feedback passage 69 is communicated to chamber 110 of the servo actuator 42.

The forward-reverse inhibit valve 51 includes a valve spool 180 having spaced equal diameter lands *a*, *b*, *c*, *d*, and *e* slidably disposed in a valve bore 181, a compression spring 182 disposed between valve land *e*, and one end of valve bore 181, and a pin 183, slidably disposed in a valve bore 184, is in abutting relationship with valve spool 180 opposite the spring 182. The pin 183 is subjected to fluid pressure in the governor passage 95. When the governor pressure in passage 95 is above a predetermined value, the valve spool 180 will be shifted downward in bore 181 until the spool abuts a stop 185. This is the inhibit position of the inhibit valve 51. It is the function of the forward-reverse inhibit valve 51 to prevent a forward to reverse shift or vice versa, whenever the governor pressure in passage 95 is above a predetermined value, thereby indicating that the hydrostatic transmission H is operating above a predetermined ratio at which ratio a vehicle direction shift would result in undesirable shift shocks in the transmission. The valve bore 181 is in fluid communication with the forward signal valve 174, the forward inhibit passage 175, the reverse signal passage 176, the reverse inhibit passage 178, a reverse neutral passage 186, and a forward neutral passage 187. In the valve position shown, the passages 176 and 178 are in fluid communication between lands a, and b, the passages 174 and 175 are in fluid communication between lands c, and d, and the passages 186 and 187 are open to exhaust. When the valve 51 is moved to the inhibit position, passage 174, and 178 are exhausted while passages 176 and 175 are in fluid communication with passages 186, and 187, respectively.

The forward neutral passage 187 and the reverse neutral passage 186 are connected with the neutral shuttle valve 52. The neutral shuttle valve 52 includes a plug 188 slidably disposed in a bore 189. The bore 189 is in fluid communication with a forward-reverse neutral passage 190. The plug 188 has a length such that, when the forward neutral passage 187 is pressurized, the plug 188 will be moved upward in the bore 189 to permit communication through the lower half of bore 189 between passages 187 and 190. When the passage 186 is pressurized, the plug 188 will be moved downward in bore 189 to permit fluid communication between passages 186 and 190 through an upper half of bore 189.

The neutral shuttle valve 53 is identical in construction with the neutral shuttle valve 52, therefore the corresponding parts are given the same numerical designation with an a suffix. The neutral shuttle valve 53 operates to provide fluid communication between the neutral passage 114 and the neutral return passage 70, or between the forward-reverse neutral passage 190 and the neutral return passage 70 when either passage 114 or 190 is pressurized.

It is a function of the neutral shuttle valves 52 and 53 to direct a neutral return signal to the operator request valve 38, when the transmission operation indicates that a neutral position is preferred in the hydrostatic portion of the transmission. There are three conditions under which the neutral shuttle valves 52 and 53 will provide this function:

1. When the manual selector valve 43 is in the N position.
2. When the forward-reverse inhibit valve is shifted by governor pressure to the inhibit position and the operator attempts to shift the transmission from forward to reverse.
3. When the forward-reverse inhibit valve is in the inhibit position and the operator attempts a directional shift in the transmission from reverse to forward.

Under any of the above three conditions, a neutral signal is transmitted to the operator request valve 38 which neutral signal acts on the pin 61 to provide an upward bias on the valve spool 58 thereby reducing the pressure in the request pressure passage 67 which will result in a reduction of the hydrostatic transmission ratio toward the neutral condition.

If the transmission is operating in a forward drive condition with the manual selector valve in either the D1 or D2 position; and the governor pressure is sufficient in passage 95 to shift the forward-reverse inhibit valve 51 to the inhibit position; and the operator moves the valve 163 from the forward position to the reverse position, the following events will occur. Reverse hold passage 160 will be pressurized thereby shifting the forward-reverse request valve to a reverse position, which will result in fluid communication between main passage 56 and the reverse passage 162, while the forward passage 161 is exhausted. Fluid pressure in passage 162 will be directed between lands d and e of valve spool 164 to passage 176. With the forward-reverse inhibit valve 51 in the inhibit position, fluid pressure in passage 176 will be directed between lands a and b of valve spool 180 to reverse neutral passage 186. Fluid pressure in reverse neutral passage 186 will be directed through the neutral shuttle valves 52 and 53 to the operator request valve 38, which fluid ressure will result in a reduction of the pressure in the request pressure passage 67. A reduction of pressure in request pressure passage 67 will result in a return signal being directed to the governor signal valve 40, which will result in a reduction in the governor pressure passage 95. As the pressure in governor passage 95 is reduced, the pressure in the feedback passage 69 will also be reduced, which will permit the servo actuator 42 to return toward the neutral position. When the pressure in governor passage 95 has been reduced to a predetermined value, the spring 182 of the forward-reverse inhibit valve 51 will move the valve spool 180 to the position shown. In this position, fluid pressure in passage 176 is directed to passage 178 between lands a and b. The pressure in passage 178 will act in chamber 171 on the end of plug 168 to move the forward-reverse servo control valve 50 to the reverse position. In the reverse position, a forward-reverse servo control valve will direct the fluid pressure in the ratio feedback passage 69 to the reverse servo chamber 110 in the servo actuator 42. As explained above, this will result in a drive ratio in the hydrostatic transmission corresponding to the fluid pressure in passage 69. Simultaneously with the movement of the forward-reverse inhibit valve 51, the neutral signal passage 70 will be exhausted, thereby permitting the pressure in the request pressure passage 67 to return to the value established by cam 65. This will result in increase in the transmission ratio in the reverse direction subject to the control of the ratio governor valve 39, the governor signal valve 40 and the ratio pressure control valve 41.

If the transmission is conditioned for reverse drive, with the inhibit valve 51 in the inhibit position; and the operator requested a forward direction by manipulating valve 163, the neutral shuttle valves 52 and 53 will function to direct a neutral return signal to the operator request valve 38. In this situation, the forward-reverse request valve 49 would be moved to the forward position due to the pressure in the forward hold passage 159. Main pressure in passage 56 would be directed to the forward passage 161, which passage is in fluid communication with the forward inhibit passage 175 between lands e and f of valve spool 164. The fluid pressure in passage 175 is directed to the chamber 169 to maintain the forward-reverse servo control valve 50 in the reverse position, and also between lands c and d of valve spool 180 to the forward neutral passage 187. As explained above for the forward reverse shift, the governor pressure in passage 95 would eventually decrease sufficiently to permit the valve spool 180 to be shifted by the spring 182. When this occurs, fluid pressure in passage 175 is directed to the forward signal passage 174 which would result in fluid pressure acting on valve land f of spool 164 in opposition to the pressure in chamber 169. This would permit the spring 166 to move the valve spool 164 to the forward position thereby completing a reverse to forward shift.

Figure 4:
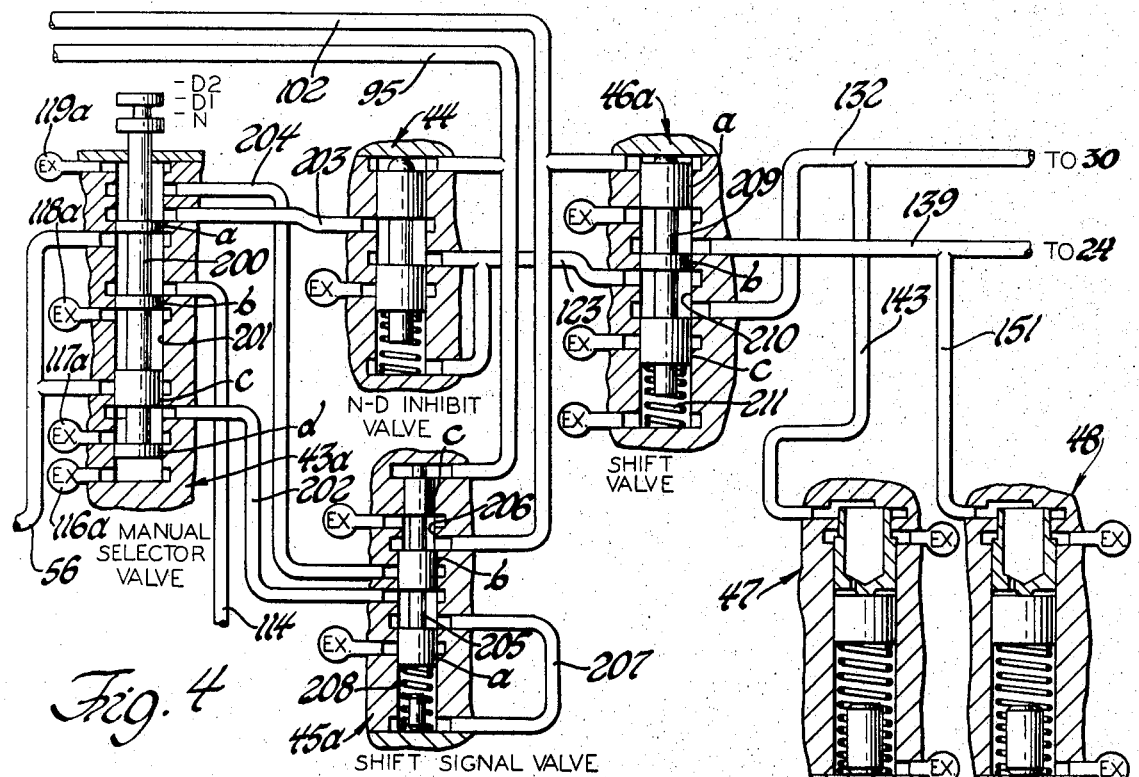

The valving shown diagrammatically in FIG. 4 is a modification of some of the valves shown in FIG. 3a. This modification permits automatic ratio interchange in the gearing between the low gear ratio and the high gear ratio. The neutral-drive inhibit valve 44 and the trimmer valves 47 and 48 are identical in construction as set forth in the previous description thereof. A manual selector valve 43a is similar in construction to the manual selector valve 43. This valve includes a valve spool 200 having spaced equal diameter lands a, b, c, and d slidably disposed in a valve bore 201. The valve bore 201 is connected to the main passage 56, the neutral passage 114, a low ratio passage 202, a drive passage 203, and a high ratio passage 204, and a plurality of exhaust passages 116a, 117a, 118a, and 119a. The valve spool 200 is movable to a neutral N, a low ratio D1 or a high ratio D2 position. In the N position, main passage 56 is in fluid communication with the neutral passage 114 while passages 202, 203, and 204 are exhausted. In the D1 position, the main passage 56 is in fluid communication with the low ratio passage 202 and the drive passage 203, while the neutral passage 114 and high ratio passage 204 are exhausted. In the D2 position, the main passage 56 is in fluid communication with the drive passage 203, and the high ratio passage 204, while the neutral passage 114 and the low ratio passage 202 are exhausted.

A shift signal valve 45a includes a valve spool 205 having spaced equal diameter lands a, b, and a smaller diameter land c which lands are slidably disposed in a step bore 206. The step bore 206 is in fluid communication with the low ratio passage 202, the high ratio passage 204, the high ratio signal passage 102, the governor passage 95, and a low ratio hold passage 207. The valve spool 205 is shown in the downshifted or low ratio position; such that passages 202 and 207 are in fluid communication between lands a and b, passage 204 is blocked by land b, and passage 102 is exhausted between lands b and c. In this position, if the manual selector valve 43a is moved to the D1 position, passage 202 will direct main pressure to the low ratio hold passage 207 which will direct a pressure bias to the end of valve spool 205 to inhibit upshifting of the valve spool 205. This will maintain the gearing in the low ratio regardless of the governor signal in passage 95. If the manual selector valve 43a is moved to the D2 position, the passage 202 is exhausted thereby exhausting the low ratio hold passage 207. Under this condition, when the pressure in governor passage 95 is sufficient to overcome the force in spring 208, the valve spool 205 will upshift thereby providing fluid communication between passage 204 and the high ratio signal passage 102.

A shift valve 46a includes a valve spool 209 having a spaced equal diameter lands a, b, and c, slidably disposed in a valve bore 210, and a compression spring 211 disposed between the end of bore 210 and valve land c. The spring 211 holds the shift valve 46a in the downshifted or low ratio position, as shown, as long as the high ratio signal passage 102 is exhausted. In the downshifted position, drive passage 123 is connected to the low ratio engage passage 132, to engage the low ratio brake 30. When the shift signal valve 45a is upshifted, as discussed above, fluid pressure in the high ratio signal passage 102 acts on the end of land a to upshift the valve spool 209. In the upshifted position, drive passage 123 is connected to the high ratio engage passage 139 between lands a and b of valve spool 209, which results in engagement of the high ratio clutch 24. Also in the upshifted position, the low ratio brake 30 is exhausted between lands b and c. The shift valve 46a and shift signal valve 45a will cooperate to provide an automatic downshift from the high ratio to the low ratio, when the pressure in the governor passage 95 decreases a sufficient amount to permit the spring 208 to move the valve spool 205 to the low ratio position. It should be noted that the differential area between lands b and c of the valve spool 205 will provide a hysteresis effect for the shift signal valve 45a. This hysteresis effect prevents hunting of the valve spool 205 on a ratio upshift and establishes a lower governor pressure for a downshift. The neutral-drive inhibit valve 44 and the trimmer valves 47 and 48 provide the same function as discussed above for FIG. 3a.

Figure 5:
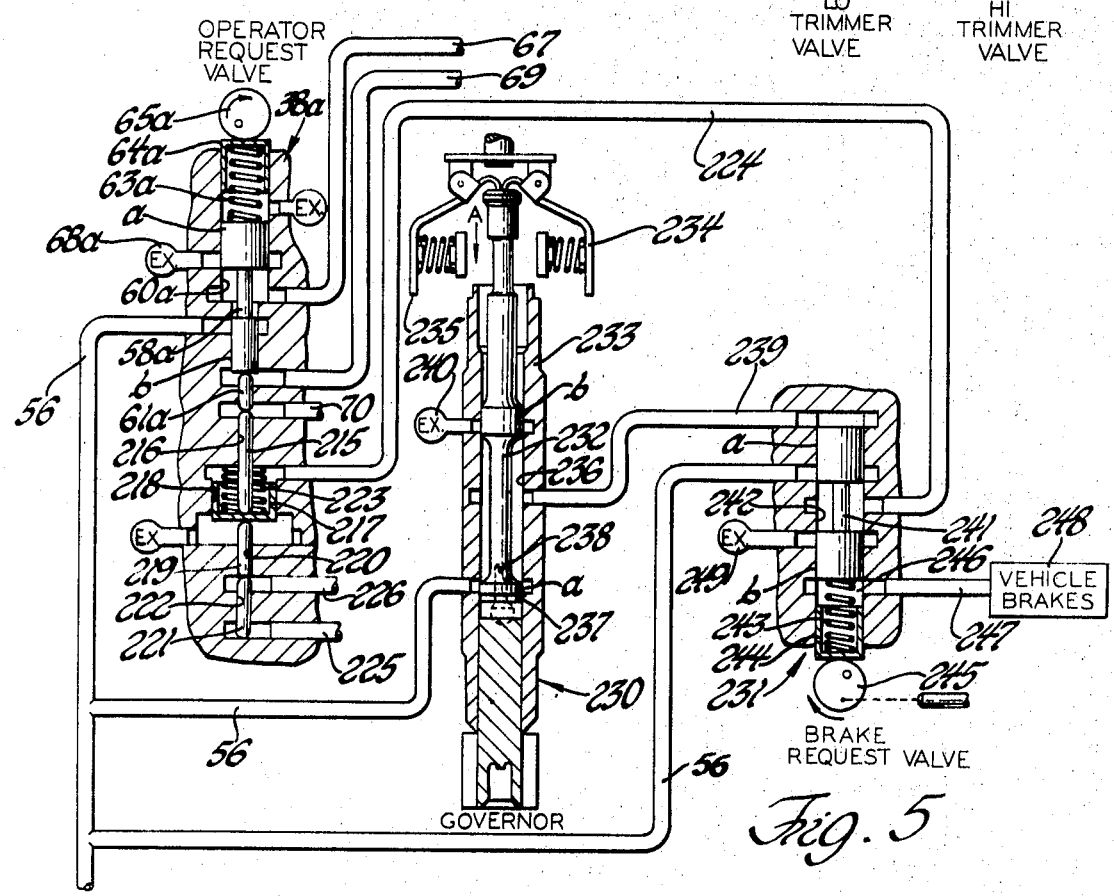
FIG. 5 is a diagrammatic representation of a modification of a portion of the control shown in FIG. 3.

The valving shown in FIG. 5 is a modification of the operation request valve 38 shown in FIG. 3. Shown in FIG. 5 is an operator request valve, generally designated 38a, which includes a valve spool 58a having a large diameter land a and a smaller diameter land b which lands are slidably disposed in a step bore 60a. A compression spring 63a is disposed between valve land a and a spring seat 64a which abuts an operator control cam 65a. This portion of the operator request valve 38a operates the same as the operator request valve 38 described previously. That is operation of the cam 65a results in main pressure in passage 56 being directed to the request pressure passage 67 which is connected to the ratio governor valve 39. Feedback pressure, in the ratio feedback passage 69, is communicated to the lower end of valve land b to provide the function as described above for operator request valve 38. The operator request valve 38a also includes a pin 215 slidably disposed in a bore 216, a spring seat 217 slidably disposed in a bore 218, a pin 219 slidably disposed in a bore 220, a pin 221 slidably disposed in a bore 222, and a spring 223 compressed between the valve seat 217 and a portion of the valve body housing for the operator request valve 38a. The one end of pin 215 is in fluid communication with a brake passage 224 and the other end abuts a pin 61a. The pin 221 abuts the pin 219 which in turn abuts the spring seat 217. The lower end of pin 221 is in fluid communication with a passage 225 and the space intermediate the pins 221 and 219 is in fluid communication with a passage 226. The passage 225 and 226 are connected to the inlet and discharge ports, not shown, of the pump 12. These passages direct the hydrostatic working pressure in the pump 12 and the motor 13 to operate on the pins 219 and 221 to prevent excess high pressure from occurring in the hydrostatic system, thereby limiting the power input to the pump 12. The main passage 56 is also connected with an engine governor 230 and a brake request valve 231.

The engine governor 230 is a fly weight type governor having a valve spool 232 slidably disposed in a rotatable housing 233. The housing 233 is adapted to be driven by the engine and is connected to rotate a pair of fly weights 234 and 235. The valve spool 232 has a pair of spaced lands a and b which are slidably disposed in a bore 236 formed in the housing 233. A chamber 237 is formed between the one end of housing 233 and valve land a, which chamber is in fluid communication with the space between lands a and b via a restricted passage 238. The space between lands a and b is also in fluid communication with a governor output passage 239. In operation, rotation of the fly weights 234 and 235 causes them to rotate radially outwardly thereby moving the valve spool 232 in the direction of arrow A. When the valve spool 232 moves in the direction of arrow A, fluid pressure from passage 56 is admitted between lands a and b. The fluid pressure, thus admitted, passes through the restricted passage 238 to chamber 237 and acts on the end of land a to provide a force in the direction opposite to arrow A. The pressure in chamber 237 increases until the spool 232 is moved to a position closing main passage 56. The pressure between lands a and b is directed to the governor output passage 239. Thus a governor output pressure proportional to governor speed is available. If the engine speed should decrease, resulting in excess pressure in chamber 237, the valve spool 232 will move opposite to the direction of arrow A until an exhaust passage 240 is opened by land b thereby permitting a decrease in governor pressure in passage 239 and chamber 237 until the valve spool 232 is again balanced.

The brake request valve 231 includes valve spool 241 having spaced equal diameter lands a and b slidably disposed in a valve bore 242. A compression spring 243 is compressed between valve land b and spring seat 244 which abuts a throttle controlled cam 245. The cam 245 is rotated in response to engine throttle movement by a linkage, not shown, to create a force in spring 243 proportional to throttle position. A fluid chamber 246 is formed between valve land b and spring seat 244, which chamber 246 is in fluid communication via passage 247 with conventional vehicle brakes 248. The end of valve bore 242 adjacent valve land a is in fluid communication with the governor output passage 239. The valve bore 242 is also in fluid communication with main 56, passage 224 and an exhaust passage 249. The function of the brake request valve 231 is to provide a ratio reduction signal to the operator request valve 38a when the operator applies the vehicle brakes. A reduction in the hydrostatic transmission ratio during braking maneuvers prevents the engine from stalling during braking. However, as the hydrostatic engine ratio is reduced the engine speed will increase. To prevent overspeeding of the engine, during vehicle braking, the governor output pressure acting on land a of valve spool 241 will move the valve spool 241 in opposition to the fluid pressure to chamber 246 supplied by the vehicle brakes 248. For example, if the vehicle brakes 248 thereby pressurizing the chamber 246, the valve spool 241 will be moved to provide fluid communication between main passage 56 and passage 224. Fluid pressure in passage 224 will act on the exposed end of pin 215 to urge the pin in a direction opposite the spring 63a. Movement of the valve spool 58a in the aforementioned direction, will result in a decrease of pressure in the request pressure passage 67, and therefore a reduction in the transmission ratio. Fluid pressure in passage 224 will also act on spring seat 217 which will maintain the pins 219 and 221 in the position shown, so that fluid pressure in the hydrostatic transmission can be extended above the limits determined by these pins, since engine overloading is not of major concern during vehicle braking. During the braking maneuvers, however, should the engine speed become excessive, fluid pressure in the governor passage 239 acting on the end of land a, will move the valve spool 241 downward in the bore 242 thereby closing passage 56 while opening passage 224 to exhaust passage 249. The passage 224 will remain exhausted until the engine speed is returned to an acceptable level.

Obviously, many modifications and variations of the present invention are possible in light of the above teachings. It is, therefore, to be understood that within the scope of the appended claims the invention may be practiced otherwise than as specifically described.

What is claimed is:

1. An engine driven transmission and control comprising: input means drivingly connected with the engine; output means; variable positive displacement hydrostatic transmission means drivingly connected with said input means including displacement control means for controlling the drive ratio of the hydrostatic transmission; gearing means drivingly connected between said hydrostatic transmission and said output means including selectively engagable drive ratio establishing means for selectively establishing low and high ratio drives; a source of fluid pressure; hydrostatic transmission control means including valve means in fluid communication with said source for providing a variable pressure source for selectively controlling the displacement control means between minimum and maximum values at a setting determined by the pressure level of the variable pressure source when the low ratio is established in said gearing means; and shift control means in fluid communication with said source of fluid pressure for controlling the interchange of said drive ratio establishing means including means for directing fluid pressure to said valve means to reduce the pressure level of the variable pressure source and the hydrostatic transmission displacement and for permitting the variable pressure to be repeated for selectively controlling the displacements between the minimum and maximum values when the high ratio is established in said gearing means.

2. An engine driven hydromechanical transmission and control comprising; input means; a variable displacement hydrostatic transmission drivingly connected to said input means including means for selectively controlling the displacement; gearing means drivingly connecting with said hydrostatic transmission including selectively operable friction drive establishing means for providing low and high ratio drives in said gearing means; output means drivingly connected with said gearing means; a source of fluid pressure; operator controlled valve means in fluid communication with said source for providing a drive ratio request signal; ratio governor means in fluid communication with said source and said operator controlled valve means for providing a governor signal in response to the drive ratio request signal and operating parameters of the engine; ratio signal means in fluid communication with said source and being responsive to the governor signal for providing a controlled variable pressure signal and being operatively connected to the displacement controlling means to establish drive ratios in said hydrostatic transmission at settings in accordance with the controlled variable pressure signal; and shift control valve means in fluid communication with said source for selectively establishing engagement of said friction drive establishing means, including means for communicating fluid pressure to said ratio signal means to reduce the controlled variable pressure signal and the hydrostatic drive ratio and for permitting the controlled variable pressure signal to repeat to reestablish the drive ratios in the hydrostatic transmission in accordance with the controlled variable pressure signal when the high ratio drive is established.

3. An engine driven hydromechanical transmission and control for use with a vehicle comprising: engine throttle control means; engine speed signal means; vehicle brake means; input means; a variable displacement hydrostatic transmission drivingly connected to said input means including means for selectively controlling the displacement; gearing means drivingly connecting with said hydrostatic transmission including selectively operable friction drive establishing means for providing low and high ratio drives in said gearing means; output means drivingly connected with said gearing means; a source of fluid pressure; operator controlled valve means in fluid communication with said source for providing a variable drive ratio request signal; ratio governor means in fluid communication with said source and said operator controlled valve means for providing a governor signal in response to the drive ratio request signal, said engine throttle control means and said engine speed signal means; ratio signal means in fluid communication with said source and being responsive to the governor signal for providing a controlled variable pressure signal and being operatively connected to the displacement controlling means to establish drive ratios in said hydrostatic transmission at settings in accordance with the controlled variable pressure signal; shift control valve means in fluid communication with said source for selectively establishing engagement of said friction drive establishing means, including means for communicating fluid pressure to said ratio signal means to reduce the controlled variable pressure signal and the hydrostatic drive ratio and for permitting the controlled variable pressure signal to repeat to reestablish the drive ratios in the hydrostatic transmission in accordance with the controlled variable pressure signal when the high ratio drive is established; and brake signal valve means responsive to operation of said vehicle brake means for providing a brake signal to said operator controlled valve means to reduce the variable drive ratio request signal.

4. In combination an engine driven hydromechanical transmission and control, said combination comprising; input means; a variable displacement hydrostatic transmission including a variable displacement hydraulic pump drivingly connected to said input means, a variable displacement hydraulic motor and means for selectively controllint the displacements of said pump and motor; gearing means drivingly connecting with said hydraulic motor including selectively operable friction drive establishing means for providing low and high ratio drives in said gearing means; output means drivingly connected with said gearing means; a source of fluid pressure; operator controlled valve means in fluid communication with said source for providing a drive ratio request signal including signal means in fluid communication with said hydraulic pump being operable to reduce the drive ratio request signal at a predetermined pressure level in said pump; ratio governor means in fluid communication with said source and said operator controlled valve means for providing a governor signal in response to the drive ratio request signal and operating parameters of the engine; ratio signal means in fluid communication with said source and being responsive to the governor signal for providing a controlled variable pressure signal and being operatively connected to the displacement controlling means to establish drive ratios in said hydrostatic transmission at settings in accordance with the controlled variable pressure signal; and shift control valve means in fluid communication with said source for selectively establishing engagement of said friction drive establishing means, including means for communicating substantially constant fluid pressure bias to said ratio signal means to reduce the controlled variable pressure signal and the hydrostatic drive ratio and for permitting the controlled variable pressure signal to repeat to reestablish the drive ratio in the hydrostatic transmission in accordance with the controlled variable pressure signal when the high ratio drive is established.

5. An engine driven hydromechanical transmission and control comprising; input means; a variable displacement hydrostatic transmission drivingly connected to said input means including means for selectively controlling the displacement; gearing means drivingly connecting with said hydrostatic transmission including selectively operable friction drive establishing means for providing low and high ratio drives in said gearing means; output means drivingly connected with said gearing means; a source of fluid pressure; operator controlled valve means in fluid communication with said source for providing a drive ratio request signal; ratio governor means in fluid communication with said source and said operator controlled valve means for providing a governor signal in response to the drive ratio request signal and operating parameters of the engine; ratio signal means in fluid communication with said source and being responsive to the governor signal for providing a controlled variable pressure signal and being operatively connected to the displacement controlling means to establish drive ratios in said hydrostatic transmission in accordance with the controlled variable pressure signal, and being operatively connected with said operator controlled valve means for modifying the drive ratio request signal in accordance with the controlled variable pressure signal; and shift control valve means in fluid communication with said source for selectively establishing engagement of said friction drive establishing means, including means for communicating fluid pressure to said ratio signal means to reduce the controlled variable pressure signal and the hydrostatic drive ratio and for permitting the controlled variable pressure signal to repeat to reestablish the drive ratios in the hydrostatic transmission in accordance with the controlled variable pressure signal when the high ratio drive is established.

6. In combination an engine driven hydromechanical transmission and control for use with a vehicle having vehicle brake means, said combination comprising; input means; a variable displacement hydrostatic transmission including a variable displacement hydraulic pump drivingly connected to said input means, a variable displacement hydraulic motor and means for selectively controlling the displacements of said pump and motor; gearing means drivingly connecting with said hydraulic motor including selectively operable friction drive establishing means for providing low and high ratio drives in said gearing means; output means drivingly connected with said gearing means; a source of fluid pressure; operator controlled valve means in fluid communication with said source for providing a drive ratio request signal including signal means in fluid communication with said hydraulic pump being operable to reduce the drive ratio request signal at a predetermined pressure level in said pump; ratio governor means in fluid communication with said source and said operator controlled valve means for providing a governor signal in response to the drive ratio request signal and operating parameters of the engine; ratio signal means in fluid communication with said source and being responsive to the governor signal for providing a controlled variable pressure signal and being operatively connected to the displacement controlling means to establish drive ratios in said hydrostatic transmission at settings in accordance with the controlled variable pressure signal; shift control valve means in fluid communication with said source for selectively establishing engagement of said friction drive establishing means, including means for communicating fluid pressure to said ratio signal means to reduce the controlled variable pressure signal and the hydrostatic drive ratio and for permitting the controlled variable pressure signal to repeat to reestablish the drive ratios in the hydrostatic transmission in accordance with the controlled variable pressure signal when the high ratio drive is established; and brake signal valve means responsive to operation of said vehicle brake means for providing a brake signal to said operator controlled valve means to reduce the variable drive ratio request signal.

* * * * *